United States Patent
De Barsy et al.

(10) Patent No.: US 9,889,711 B2
(45) Date of Patent: Feb. 13, 2018

(54) PNEUMATIC TIRE

(71) Applicant: The Goodyear Tire & Rubber Cmpany, Akron, OH (US)

(72) Inventors: Olivier De Barsy, Eischen (LU); Daniel Scheuren, Arlon (BE)

(73) Assignee: The Goodyear Tire & Rubber Company, Akron, OH (US)

( * ) Notice: Subject to any disclaimer, the term of this patent is extended or adjusted under 35 U.S.C. 154(b) by 308 days.

(21) Appl. No.: 14/872,256

(22) Filed: Oct. 1, 2015

(65) Prior Publication Data

US 2016/0023521 A1    Jan. 28, 2016

Related U.S. Application Data

(62) Division of application No. 12/975,879, filed on Dec. 22, 2010, now Pat. No. 9,174,495.

(51) Int. Cl.
*B60C 11/12* (2006.01)
*B60C 11/03* (2006.01)

(52) U.S. Cl.
CPC ........ *B60C 11/124* (2013.01); *B60C 11/1204* (2013.01); *B60C 11/1218* (2013.01); *B60C 11/1259* (2013.01); *B60C 11/1272* (2013.01); *B60C 11/0306* (2013.01); *B60C 2011/1209* (2013.01); *B60C 2011/129* (2013.01)

(58) Field of Classification Search
CPC ............... B60C 11/1218; B60C 11/124; B60C 2011/129; B60C 2011/1209
See application file for complete search history.

(56) References Cited

U.S. PATENT DOCUMENTS

| | | | |
|---|---|---|---|
| 2,186,180 A | 1/1940 | Sloman et al. | |
| 5,814,169 A | 9/1998 | Yamaguchi et al. | |
| 6,601,623 B1 * | 8/2003 | Katayama | B60C 11/12 152/209.15 |
| 2004/0003879 A1 | 1/2004 | Radulescu | |
| 2009/0223613 A1 * | 9/2009 | Saeki | B29D 30/0606 152/209.18 |

FOREIGN PATENT DOCUMENTS

| | | |
|---|---|---|
| EP | 810104 | 12/1997 |
| EP | 1108566 | 6/2001 |

(Continued)

OTHER PUBLICATIONS

Machine translation for Japan 2001-063322 (no date).*
Machine translation for Japan 11-342706 (no date).*

*Primary Examiner* — Steven D Maki
(74) *Attorney, Agent, or Firm* — David L. King

(57) ABSTRACT

The present invention is directed to a pneumatic tire 1, comprising at least one pair of parallel annular beads 3; at least one carcass ply wrapped 5 around said beads 3; a tread 7; and first and second sidewalls 9 disposed between said tread 7 and one of said at least one pair of beads 3. In accordance with an embodiment of the invention, the tread comprises tread blocks 11 and/or tread ribs 12, wherein the tread blocks 11 and/or tread ribs 12 comprise sipes 13 extending essentially in an axial direction A of the tire 1, the sipes 13 consisting of an upper portion 15 essentially aligned with the radial direction R of the tire and a lower portion 17 inclined in the direction of rotation D of the tire 1.

5 Claims, 2 Drawing Sheets

(56) References Cited

FOREIGN PATENT DOCUMENTS

| | | | |
|---|---|---|---|
| EP | 1167084 | | 1/2002 |
| JP | 2824675 | | 11/1998 |
| JP | 11-342706 A | * | 12/1999 |
| JP | 2001-063322 A | * | 3/2001 |
| JP | 2002002234 | | 1/2002 |
| JP | 2002225512 | | 8/2002 |
| JP | 2005035342 | | 2/2005 |
| WO | 02055324 | | 7/2002 |
| WO | 2010000797 | | 1/2010 |

* cited by examiner

PNEUMATIC TIRE

RELATED APPLICATIONS

The present patent application is a division of co-pending U.S. application Ser. No. 12/975,879 filed on Dec. 22, 2010 entitled "Pneumatic Tire".

FIELD OF THE INVENTION

The present patent application is directed to a tire, in particular a pneumatic tire comprising narrow grooves in blocks or ribs of the tire's tread.

BACKGROUND OF THE INVENTION

Multiple types of tires comprise treads having narrow grooves in their tread blocks or tread ribs. In particular, in modern long haul drive tires such narrow grooves or sipes are part of the tread design. In general, such sipes may increase mileage and fuel economy so that they have often been applied in the past.

However, it has been observed that under heavy duty or extensive use such sipes may provoke fatigue cracks starting to propagate at the bottom of the sipes.

To overcome this problem, typical solutions of the prior art utilize an increased groove bottom radius of the sipes, e.g. by using ball-bottom blades in the mold. However, this is only a partial solution which leads to losses of design parameters and may result in drawbacks in relation to driving mileage and fuel economy. Moreover, the production of respective blades can be difficult and expensive.

European patent application EP 1 167 084 A2 discloses a tire comprising a tread portion having a plurality of tread blocks each provided with at least one sub-groove having a special shape to improve wear resistance. In one embodiment of this tire, the bottom of the sub-grooves is inclined from the outer surface of the block toward a direction of the braking force as a main stress applied from the road surface to the respective tread block and along a forward rotating direction of the tire.

This tire may constitute an improvement with respect to earlier tread designs including sipes having essentially a perpendicular orientation with respect to the surface of the tread blocks. Nevertheless, tire performance may be reduced by the mentioned design. In particular, a considerable overhang of the tread block portions divided by the sipes exists, leading to drawbacks in performance and durability of the tire.

SUMMARY OF THE INVENTION

In view of the above mentioned prior art, it is an object of the invention to improve the performance and/or the durability of a tire comprising sipes or grooves in tread blocks or tread ribs.

It is another object of the present invention to improve or at least to maintain driving mileage and fuel economy of a tire comprising sipes in the tread portion and to reduce simultaneously fatigue cracks at the bottom of the sipes.

In a first aspect of the invention, the tire comprises at least one pair of parallel annular beads; at least one carcass ply wrapped around said beads; a tread; and first and second sidewalls disposed between said tread and one of said at least one pair of beads. Still in accordance with the first aspect of the invention, the tread comprises tread blocks and/or tread ribs, wherein the tread blocks and/or tread ribs comprise sipes extending essentially in an axial direction of the tire, the sipes consisting of an upper portion essentially aligned with the radial direction of the tire and a lower portion having a lower end inclined in the direction of rotation of the tire. Moreover, the lower portion and the upper portion of the sipes extend from the tread block's surface or the tread rib's surface to the bottom of the sipe.

This advantageous design results in a significant reduction of fatigue cracks starting from the bottom of the sipes. No complicated bottom shape of the sipes, resulting in high costs for the blades of the mold or resulting in a reduction of design parameters of the tread, is required. Furthermore, the overlap of the portions of the tread blocks or tread ribs divided by the sipes is reduced if compared with inclined prior art sipes. In general, the stability and performance of the tread is improved. Furthermore, fuel economy and driving mileage are maintained on a high level.

In accordance with another aspect of the invention, the upper portion of the sipes extends at most over 25% of the whole height of the sipes measured in the radial direction. In particular, this maximum height of the radial part of the sipes results in a further enhancement of the above mentioned effects.

In accordance with yet another aspect of the invention, the upper portion of the sipes is comprised between 5% and 20% of the whole height of the sipes measured in the radial direction. In particular, this relative range of the radially upper sipe has proved to be of particular interest.

In accordance with another aspect of the invention, the tire comprises at least one pair of parallel annular beads; at least one carcass ply wrapped around said beads; a tread; and first and second sidewalls disposed between said tread and one of said at least one pair of beads. Moreover, the tread comprises tread blocks and/or tread ribs, wherein the tread blocks and/or tread ribs comprise sipes extending essentially in an axial direction of the tire. The sipes consist of an (radially) upper portion essentially aligned with the radial direction of the tire, a (radially) mid portion having a (radially) lower end inclined in the direction of rotation of the tire, and a (radially) lower portion essentially aligned with the radial direction of the tire.

In a general aspect of the invention, the sipes may extend axially over the whole width of the tread blocks or tread ribs. If extending over the whole width of the blocks or ribs, fuel economy and driving mileage are increased.

In another general aspect of the invention, the depth of the sipes measured in the radial direction of the tire is comprised between 70% and 105% of the radial height of the tread blocks or tread ribs. This feature specifies another preferred design parameter of the sipes.

In yet another general aspect of the invention, the portion inclined in the direction of rotation is inclined with an angle comprised between 5° and 35° relative to the radial direction, and preferably with an angle comprised between 10° and 30° relative to the radial direction. These preferred inclination angles result in good performance properties of the tread and reduce also fatigue crack formation resulting in an improved durability of the tire.

In accordance with still another general aspect of the invention, tread blocks comprise at least two, preferably at least three, and even more preferably, at least four sipes. The number of sipes in a tread rib is comprised between 30 and 70, and preferably between 40 and 60.

In accordance with still another general aspect of the invention, the sipes have a width of between 0.3 mm and 1 mm if measured in a direction parallel to the equatorial plane of the tire.

According to another general aspect of the invention, the sipes have a straight shape in the axial direction of the tire. In particular, this shape results in high driving mileage, fuel economy and durability.

According to another aspect of the invention, and if the tire comprises sipes with an upper, a mid and a lower portion, the height of the upper radial portion and the lower radial portion is each at most 25% of the complete height of the sipe measured in a radial direction. This ratio of height of the upper and lower radial portions has proven to be of particular advantage. Fatigue cracks are reduced, thereby improving the durability of the tire. The performance of the tire is enhanced as well. In particular, the height of each of the upper radial portion and the lower radial portion is comprised between 5% and 20% of the complete height of the sipe measured in the radial direction. This range is preferred for further optimizing the above mentioned properties of the tire.

It is remarked that the above mentioned aspects or features can also be combined with each other, whereas resulting combinations are comprised in the scope of the present invention as well.

DEFINITIONS

As used herein and in the claims,

"Axial" and "axially" refer to directions which are parallel to the axis of rotation of a tire;

"Radial" and "radially" refer to directions that are perpendicular to the axis of rotation of a tire;

"Bead" refers to that part of a tire comprising an annular tensile member, the bead core, wrapped by ply cords and shaped, with or without other reinforcement elements to fit a designed tire rim;

"Carcass" refers to the tire structure apart from the belt structure, tread, undertread, and sidewall rubber but including the beads, (carcass plies are wrapped around the beads);

"Circumferential" refers to lines or directions extending along the perimeter of the surface of the annular tread perpendicular to the axial direction;

"Direction of rotation" refers to the tire's direction of rotation during normal forward driving of a vehicle;

"Equatorial plane (EP)" refers to a plane that is perpendicular to the axis of rotation of a tire and passes through the center of the tire's tread;

"Lower/Upper" refers to positions in the radial direction of the tire;

"Ply" refers to a continuous layer of rubber coated parallel cords; and

"Sipe" refers to a (narrow) groove in a tread block or a tread rib resulting from a blade inserted into the rubber during molding.

BRIEF DESCRIPTION OF THE DRAWINGS

The accompanying drawings, which are incorporated in and constitute a part of this specification, illustrate embodiments of the invention and, together with a general description of the invention given above, and the detailed description given below, serve to explain the invention.

DETAILED DESCRIPTION OF THE INVENTION

Figure 1A:
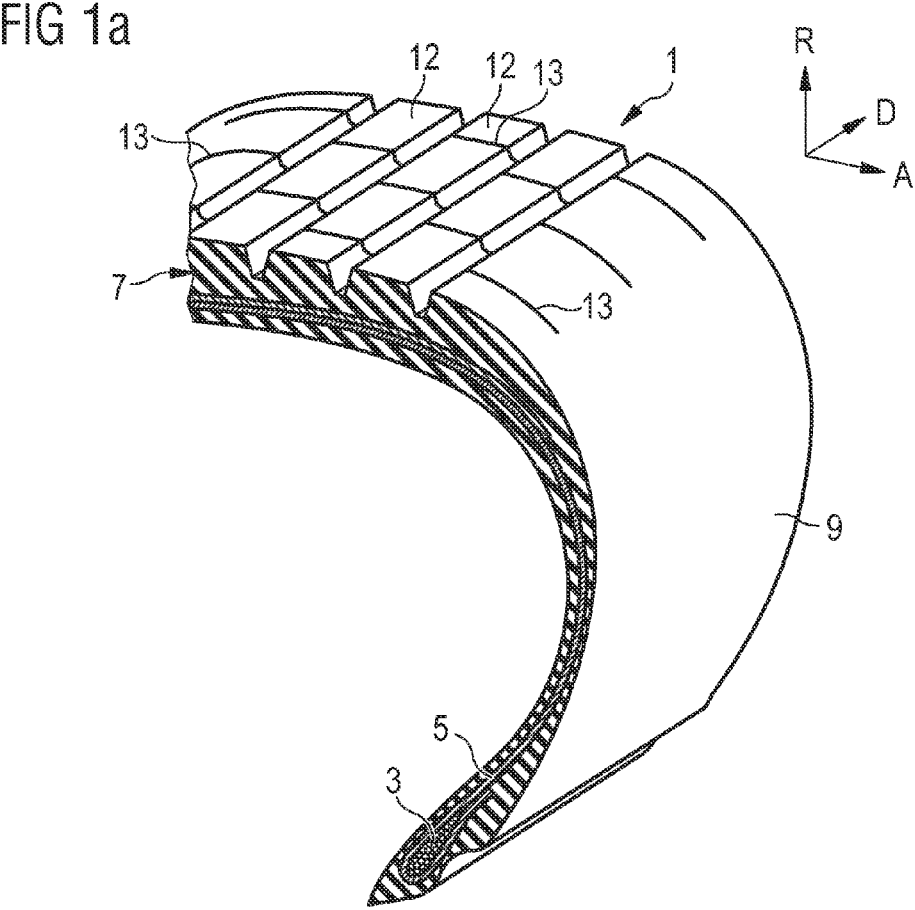
FIG. 1a is a perspective partial view of a tire comprising a tread portion having tread ribs with sipes in accordance with an embodiment of the invention.

The following language is of the best presently contemplated mode or modes of carrying out the invention. This description is made for the purpose of illustrating the general principles of the invention and should not be understood in a limiting sense. The scope of the invention is best determined by reference to the appended claims. The reference numerals as depicted in the drawings are the same as those referred to in the specification.

FIG. 1a depicts one preferred embodiment of the invention showing a tire 1 comprising beads 3 and a carcass ply 5 wrapped around said beads 3 and a tread 7 radially above a crown area of the tire 1. Sidewalls 9 are arranged between the tread 7 and the beads 3 of the tire 1. For the sake of a better comprehensibility, a coordinate system has been included in FIG. 1a showing the radial direction R, the axial direction A and the direction of the tire's rotation D.

In the embodiment depicted in FIG. 1a the tread comprises tread ribs 12. As generally known, such ribs 12 surround the tire 1 in a circumferential direction. The tread ribs 12 of the tire 1 comprise sipes 13. In accordance with the invention, the sipes 13 extend essentially in the axial direction A of the tire 1. However, this shall comprise also directions within an angle of less than 10° with respect of the axial direction A. In accordance with the depicted embodiment, the sipes 13 have a width of below 1 mm in the circumferential direction of the tire 1. In particular the sipes 13 should not be confused with grooves between different tread blocks. The sipes 13 have a (radially) upper part 15 coming into contact with the road surface and arranged in the radial direction R. Furthermore, the sipes 13 have a lower part 17 inclined in the direction of rotation D. In particular, the sipes 13 may consist of only these two portions.

Figure 1B:
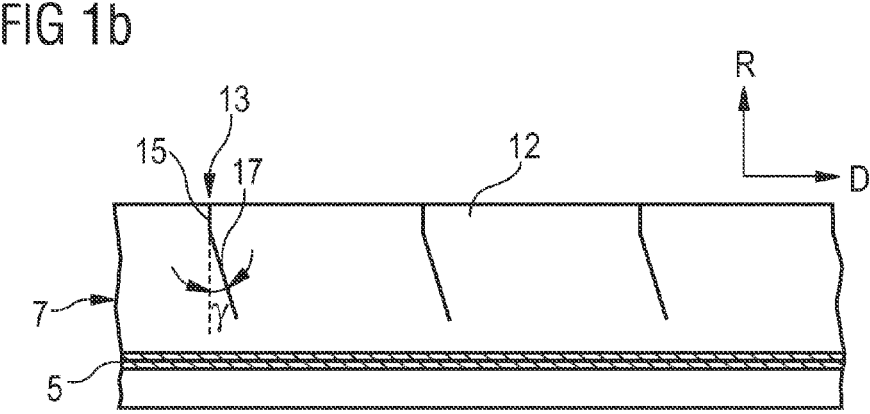
FIG. 1b shows a partial cross section of a tread rib according to FIG. 1a, parallel to the equatorial plane of the tire.

For the sake of a better visualization of the sipes, a cross section of a tread rib 12 in parallel to the equatorial plane EP of the tire 1 is shown in FIG. 1b. In this schematic illustration, the tread portion 7, in particular a tread rib 12, is shown above the carcass plies 5. Of course it would be possible that further reinforcement elements, as e.g. belt elements or further tread base layers etc., are comprised in the tire 1. The depicted layers and reinforcement elements must not be interpreted in a limiting sense. In accordance with the depicted embodiment of the invention, the sipes 13 are shown with a (radially) upper portion 15 and a (radially) lower portion 17. The upper portion 15 extends over only a rather short radial length of the total depth of the sipe 13. In contrast, the lower portion 17 extends over the major part of the total radial depth of the sipe 12. In particular, the radial length of the upper portion 15 of the sipe 12 is less than 25% of radial extension of the sipe 12. Moreover, the angle of inclination γ of the lower portion 17 may be comprised between 5° and 35° with respect to the radial direction R.

Figure 2:
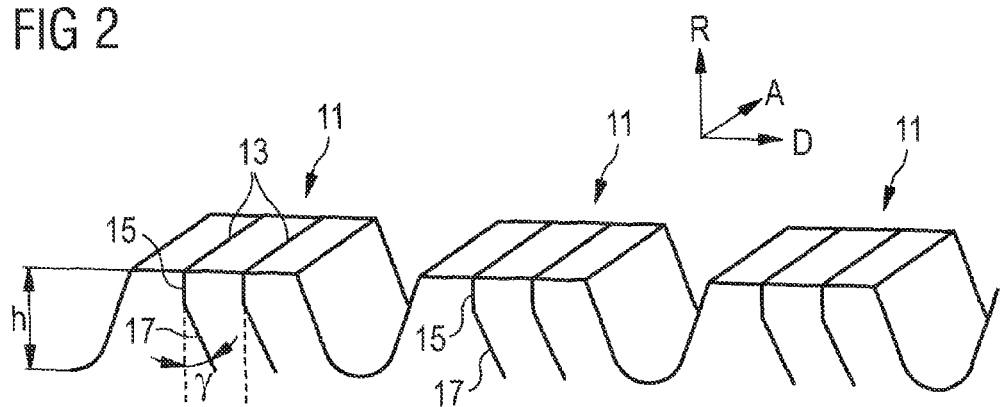
FIG. 2 is a perspective view of tread blocks in accordance with an embodiment of the invention.

As shown in FIG. 2, the present invention is not restricted to sipes 13 in tread ribs 12. The sipes 13 may also be comprised in tread blocks 11. As already described with respect to FIG. 1, the sipes 13 may comprise two portions, i.e. an upper portion 15 directed in the radial direction R and a lower portion 17 inclined with its lower end in the direction of rotation D. As depicted in FIG. 2, the sipes 13 preferably extend over the whole axial width of the tread blocks 11. However, other axial lengths of the sipes would be possible. Furthermore, the radial extension of a complete sipe is preferably comprised between 70% and 105% of the respective tread block height h.

Figure 3:
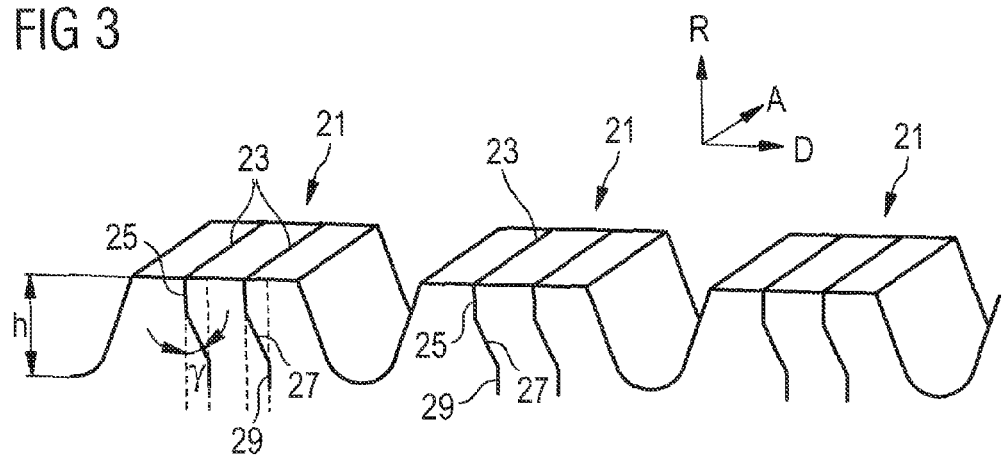
FIG. 3 is a perspective view of tread blocks in accordance with another embodiment of the invention.

FIG. 3 shows another embodiment of a tread portion having tread blocks 21 comprising sipes 23. Although the sipes 23 extend essentially in an axial direction A as shown in FIG. 2, their shape in a plane parallel to the equatorial plane of the tire is different than depicted before.

In particular, a respective sipe 23 consists of three parts, i.e. an upper part 25 extending essentially in a radial direction R, a mid part 27 being inclined with its lower end in the direction of rotation D, and a lower part 29 extending essentially in the radial direction R of the tire 1. The inclination angle γ of the mid part 27 may be equal to the angles γ according to the embodiments of FIGS. 1 and 2. The length of the upper radial part 25 and the lower radial part 29 is each shorter than 25% of the total radial extension of the sipes 23.

Of course the sipes 23 shown in FIG. 3 could also be implemented in a tire having tread ribs as shown in FIG. 1.

The invention has been described with reference to best modes. Obviously, modifications and alterations will occur to others upon reading and understanding of this specification. It is intended to include all such modifications and alterations in so far as they come within the scope of the appended claims or the equivalents thereof.

The invention claimed is:

1. A pneumatic tire comprising:
at least one pair of parallel annular beads;
at least one carcass ply wrapped around said beads;
a tread;
first and second sidewalls disposed between said tread and one of said at least one pair of beads;
the tread comprising tread blocks and/or tread ribs, wherein the tread blocks and/or tread ribs comprise sipes extending essentially in an axial direction of the tire, the sipes consisting of an upper portion essentially aligned with the radial direction of the tire, a mid portion having a lower end inclined in a forward direction of rotation of the tire, and a lower portion essentially aligned with the radial direction of the tire, wherein the sipes have a width of between 0.3 mm and 1 mm in a direction parallel to the equatorial plane of the tire, wherein the depth of the sipes measured in the radial direction of the tire is comprised between 70% and 105% of the radial height of the tread blocks or the tread ribs, wherein the height of each of the upper radial portion and the lower radial portion is comprised between 5% and 20% of the complete height of the sipe measured in the radial direction, the mid portion being at least 60 percent of the complete height of the sipe and the mid portion inclined in the direction of rotation is inclined with an angle comprised between 5° and 35° relative to the radial direction, and preferably with an angle comprised between 10° and 30° relative to the radial direction.

2. The tire according to claim 1, wherein the sipes extend axially over the whole width of the tread blocks or tread ribs.

3. The tire according to claim 1, wherein said tread blocks comprise at least 2, and preferably, at least 3 sipes.

4. The tire according to claim 1, wherein the number of sipes in a tread rib is comprised between 30 and 70, and preferably between 40 and 60.

5. The tire according to claim 1, wherein the sipes have a straight shape in the axial direction of the tire.

\* \* \* \* \*